(12) United States Patent
Mihara

(10) Patent No.: US 7,886,279 B2
(45) Date of Patent: Feb. 8, 2011

(54) INFORMATION PROCESSING APPARATUS, CONTROL METHOD THEREFOR, COMPUTER PROGRAM, AND STORAGE MEDIUM

(75) Inventor: Makoto Mihara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1205 days.

(21) Appl. No.: 11/298,856

(22) Filed: Dec. 9, 2005

(65) Prior Publication Data

US 2006/0146847 A1 Jul. 6, 2006

(30) Foreign Application Priority Data

Dec. 16, 2004 (JP) .............................. 2004-364782

(51) Int. Cl.
*G06F 11/00* (2006.01)
*G06F 9/44* (2006.01)

(52) U.S. Cl. ..................... 717/128; 717/124; 717/126; 717/127; 714/37; 714/38; 714/45; 714/50

(58) Field of Classification Search .............. 714/25, 714/30, 33, 37, 38; 717/107, 108, 126, 127, 717/128, 150, 155

See application file for complete search history.

(56) References Cited

U.S. PATENT DOCUMENTS

| | | | | |
|---|---|---|---|---|
| 5,740,355 A | * | 4/1998 | Watanabe et al. .............. 714/45 |
| 5,768,132 A | * | 6/1998 | Cordery et al. .............. 705/410 |
| 5,819,094 A | * | 10/1998 | Sato et al. .................... 717/131 |
| 5,951,653 A | | 9/1999 | Hill et al. |
| 6,219,152 B1 | * | 4/2001 | Someya et al. ............. 358/1.16 |
| 6,457,142 B1 | * | 9/2002 | Klemm et al. ................. 714/38 |
| 6,892,326 B2 | | 5/2005 | Ma et al. |
| 6,996,808 B1 | | 2/2006 | Niewiadomski et al. |
| 7,188,279 B2 | | 3/2007 | Iizuka |
| 7,240,244 B2 | | 7/2007 | Teegan et al. |
| 7,353,501 B2 | | 4/2008 | Tang et al. |
| 7,478,282 B2 | | 1/2009 | Iisuka |
| 2001/0027462 A1 | * | 10/2001 | Muramatsu ................. 709/102 |

(Continued)

FOREIGN PATENT DOCUMENTS

JP 10-269105 A 10/1998

(Continued)

OTHER PUBLICATIONS

The above references were cited in a Jul. 22, 2008 US Office Action issued in a related U.S. Appl. No. 11/298,842, a which is enclosed.

(Continued)

*Primary Examiner*—Emerson C Puente
*Assistant Examiner*—Jonathan R Labud
(74) *Attorney, Agent, or Firm*—Cowan, Liebowitz & Latman, P.C.

(57) ABSTRACT

An information processing apparatus executes a first module, a second module, and a third module for mediating a call from the first module to a function in the second module and obtaining the log of processing in the second module in response to the call. The apparatus obtains the log from the third module, extracts, from the obtained log, attribute information of functions and identifiers assigned to the functions, and determines, on the basis of attribute information of a first function and a second function among the extracted functions, identifiers assigned to the first function and the second function, whether processing in the second module has normally ended.

8 Claims, 15 Drawing Sheets

U.S. PATENT DOCUMENTS

| | | | |
|---|---|---|---|
| 2003/0084376 A1* | 5/2003 | Nash et al. | 714/38 |
| 2003/0167421 A1* | 9/2003 | Klemm | 714/37 |
| 2003/0188217 A1* | 10/2003 | Spiegel | 714/4 |
| 2004/0003326 A1* | 1/2004 | Lizuka | 714/45 |
| 2004/0225923 A1 | 11/2004 | Teegan et al. | |
| 2005/0114738 A1 | 5/2005 | Ma et al. | |
| 2006/0085667 A1* | 4/2006 | Kubota et al. | 714/4 |

FOREIGN PATENT DOCUMENTS

| | | |
|---|---|---|
| JP | 2000-181749 A | 6/2000 |
| JP | 2002-189596 A | 7/2002 |
| JP | 2004-038311 | 2/2004 |
| JP | 2004-310203 A | 11/2004 |
| JP | 2004-318524 A | 11/2004 |

OTHER PUBLICATIONS

The above references were cited in a Dec. 14, 2009 Japanese Office Action, which is enclosed without English Translation, that issued in Japanese Patent Application No. 2004-364782.

* cited by examiner

FIG. 11

```
[PATHANDLECHECKER]
[DLL SETTING]
DllName=HandleChenk.dll          ──1102
TLBFile=HandleChenk.tlb          ──1103

TraceFunc=OpenDevice             ──1104
GroupID=0x01                     ──1105
FunkProperty=0x02                ──1106
ParaError=0.DWORD,0x02,!=.0      ──1107

TraceFunc=CloseDevice            ──1108
GroupID=0x01                     ──1109
FunkProperty=0x01                ──1110
ParaError=1.DWORD,0x01,!=.0      ──1111
```

```
[PATHANDLECHECKER]
[DLL SETTING]
DllName=HandleChenk2.dll         ───1302
TLBFile=HandleChenk2.tlb         ───1303

TraceFunc=MemoryAlloc            ───1304
GroupID=0x02                     ───1305
FunkProperty=0x02                ───1306
ParaError=0.DWORD,0x02,!=.0      ───1307

TraceFunc=MemoryFree             ───1308
GroupID=0x02                     ───1309
FunkProperty=0x01                ───1310
ParaError=1.DWORD,0x01,!=.0      ───1311

TraceFunc=MemoryRealloc          ───1312
GroupID=0x02                     ───1313
FunkProperty=0x04                ───1314
ParaError=1.DWORD,0x01,!=.0      ───1315
ParaError=0.DWORD,0x02,!=.0      ───1316
```

| HANDLE CHECK ERROR | MODULE NAME | FUNCTION NAME | ARGUMENT | RETURN VALUE | |
|---|---|---|---|---|---|
| | HandleCheck.dll | OpenDevice | | DWORD handle : 0x5034206D | ← 1502 |
| | HandleCheck.dll | CloseDevice | DWORD handle : 0x5034206D | | ← 1503 |
| × | HandleCheck.dll | CloseDevice | DWORD handle : 0x5034206D | | ← 1504 |
| × | HandleCheck.dll | MemoryAlloc | | DWORD handle : 0x50341024 | ← 1505 |
| | HandleCheck.dll | MemoryAlloc | | DWORD handle : 0x50240512 | ← 1506 |
| | HandleCheck.dll | MemoryRealloc | DWORD handle : 0x50240512 | DWORD handle : 0x50240500 | ← 1507 |
| × | HandleCheck.dll | MemoryFree | DWORD handle : 0x50240512 | | ← 1508 |
| | HandleCheck.dll | MemoryFree | DWORD handle : 0x50240500 | | ← 1509 |

1501

INFORMATION PROCESSING APPARATUS, CONTROL METHOD THEREFOR, COMPUTER PROGRAM, AND STORAGE MEDIUM

FIELD OF THE INVENTION

The present invention relates to an information processing apparatus, control method therefor, computer program, and storage medium.

BACKGROUND OF THE INVENTION

A software failure at a low recall ratio is often dealt with by obtaining a software processing log. The processing log is conventionally obtained by correcting an application software module and adding a processing log obtaining routine. The method which requires correction of application software such as embedding of a log obtaining code complicates correction processing.

Against this background, there is proposed a method capable of obtaining a processing log by providing a log obtaining module without performing any complicated correction of application software itself (see Japanese Patent Application Laid-open No. 2004-38311). In software divided into a plurality of modules; the log obtaining module mediates a call for a function present in a given module from a module corresponding to application software, and obtains a processing log in the given module which responds to the call.

Processes executed in the software include processes which must always call a predetermined end function after a call for a function whose operation is paired with that of the end function, such as memory allocation/memory free or the start of a device/the end of the device. At this time, if processing which has not ended because its end function has not been called remains, the processing influences execution of another processing. Thus, it must be reliably determined whether an end function has been called.

SUMMARY OF THE INVENTION

It is an object of the present invention to make it possible to determine whether processing by functions whose operations are paired has normally ended.

According to one aspect of embodiments of the present invention, an information processing apparatus which executes a first module, a second module, and a third module for mediating a call from the first module to a function in the second module and obtaining a log of processing in the second module in response to the call comprises a log obtaining unit which obtains the log from the third module, an extraction unit which extracts, from the obtained log, attribute information of functions and identifiers assigned to the functions, and an end determination unit which determines, on the basis of attribute information of a first function and a second function among the extracted functions, identifiers assigned to the first function and the second function, whether the processing in the second module has normally ended.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 is a view showing an example of a handle attribute definition file according to the embodiment of the present invention;

FIG. 13 is a view showing another example of the handle attribute definition file according to the embodiment of the present invention;

FIG. 15 is a table showing an example of a processing result display window displayed on a display 8 in step 1421 in the flowchart of FIG. 14.

DETAILED DESCRIPTION OF THE PREFERRED EMBODIMENTS

Preferred embodiments of the present invention will now be described in detail in accordance with the accompanying drawings.

Figure 1:
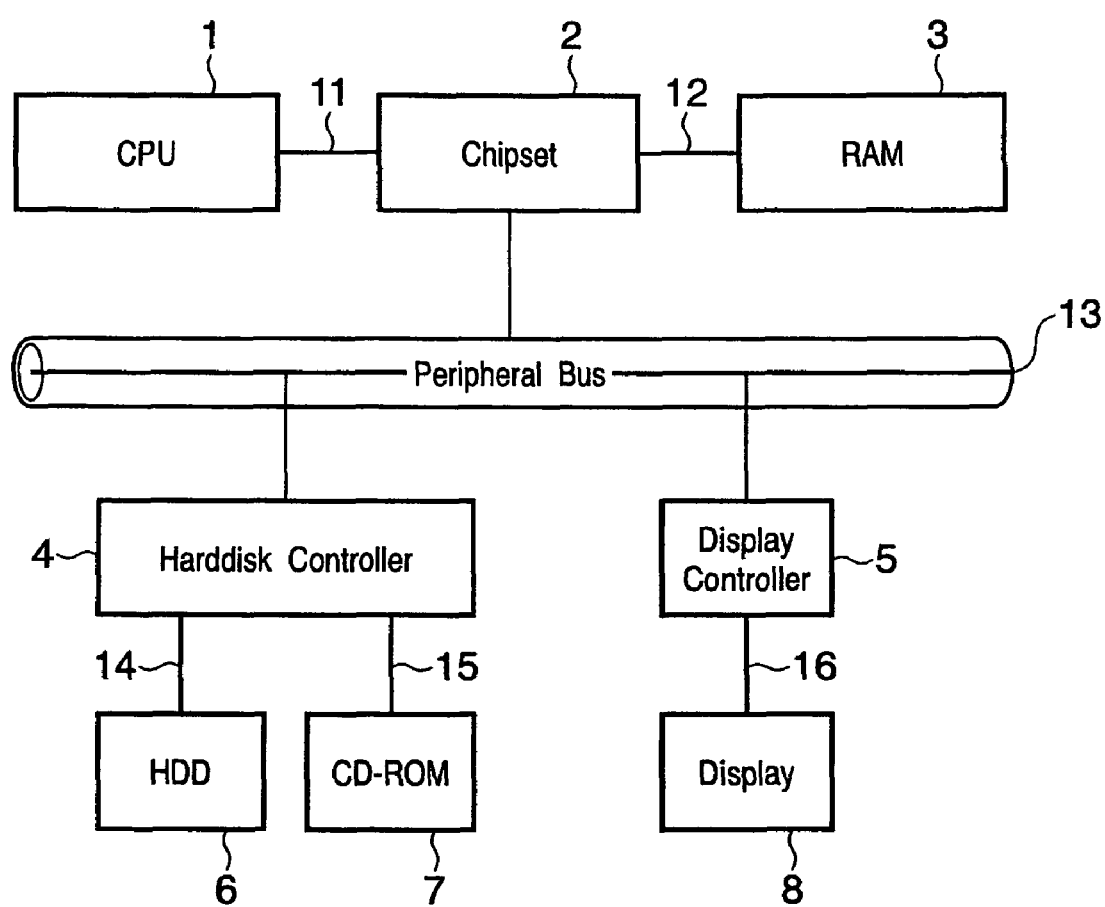
FIG. 1 is a block diagram showing an example of the configuration of an information processing apparatus according to an embodiment of the present invention.

FIG. 1 is a block diagram showing an example of the configuration of an information processing apparatus according to an embodiment. For descriptive convenience, the information processing system is constructed in one PC in the embodiment. However, characteristic features of the present invention are effective regardless of whether the information processing system is constructed in one PC or in a plurality of PCs as a network system.

The information processing apparatus comprises a CPU 1, chipset 2, RAM 3, harddisk controller 4, display controller 5, harddisk drive 6, CD-ROM drive 7, and display 8. The information processing apparatus incorporates a signal line 11 which connects the CPU 1 and chipset 2, a signal line 12 which connects the chipset 2 and RAM 3, a peripheral bus 13 which connects the chipset 2 and various types of peripheral devices 4 and 5, a signal line 14 which connects the harddisk controller 4 and harddisk drive 6, a signal line 15 which connects the harddisk controller 4 and CD-ROM drive 7, and a signal line 16 which connects the display controller 5 and display 8.

Figure 2:
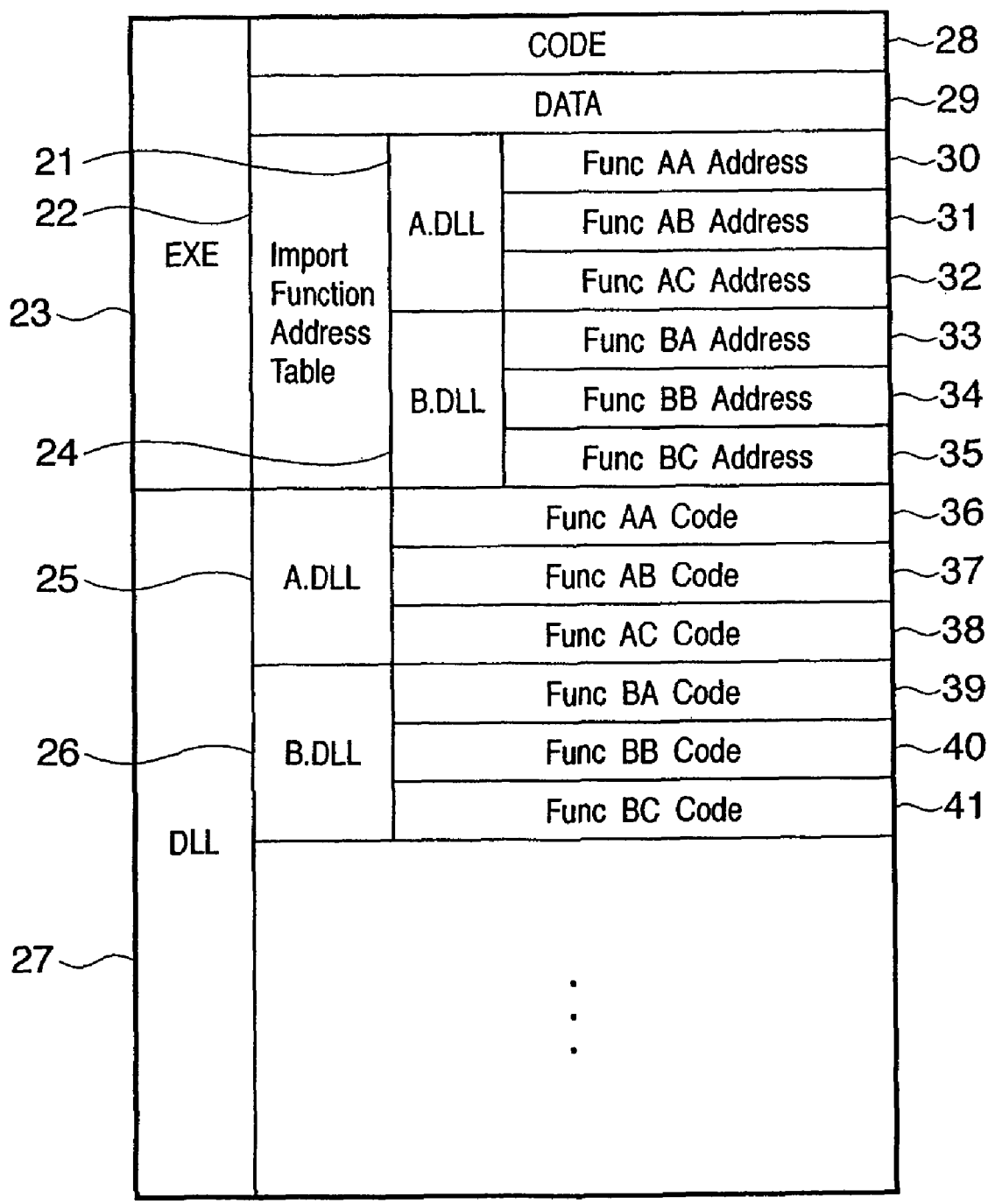
FIG. 2 is a view for explaining a case wherein software divided into a plurality of modules is loaded into the memory of the information processing apparatus according to the embodiment of the present invention.

To explain the information processing apparatus according to the embodiment, how to load, into a memory in a normal state, software which is divided into a plurality of modules will be explained with reference to FIG. 2. FIG. 2 is a view showing an example of the internal configuration of the RAM.

In general, software divided into a plurality of modules exists separately as an executable file EXE (23) which controls the overall operation, and a dynamic link library DLL (27) which exists as a module and plays a complementary role of EXE. Both EXE and DLL are loaded into the RAM 3. EXE is made up of a code segment (28), data segment (29), and import function address table (22). The import function address table is subdivided into DLLs (21 and 24) to which functions belong. Each DLL holds an address at which each function is loaded (30 to 35).

The entities of the functions in the DLLs are loaded for the respective DLLs (25 and 26), and the functions are loaded as parts of corresponding DLLs (36 to 41). In FIG. 2, one EXE uses functions in two dynamic link libraries for A.DLL and B.DLL. Functions used actually are six functions: Func AA, Func AB, Func AC, Func BA, Func BB, and Func BC.

When a code in the code segment 28 of EXE calls the function Func AA, a Func AA address (30) that is written in the import function address table is read. In practice, the address of a Func AA code (36) which is read as part of A.DLL is written. By calling the address, the EXE code can call Func AA of A.DLL.

An example of the memory configuration of the information processing apparatus when a function call is mediated using IAT Patch (Import Address Table Patch) as a log obtaining code will be explained with reference to FIG. 3.

After the start of obtaining a log, C.DLL (58) serving as an IAT Patch DLL is loaded into the memory. C.DLL rewrites the addresses of functions written in an import function address table (52) into those (61 to 66) of log obtaining codes Func CAA, Func CAB, Func CAC, Func CBA, Func CBB, and Func CBC in C.DLL. The codes (73 to 78) of Func CAA, Func CAB, Func CAC, Func CBA, Func CBB, and Func CBC in C.DLL record logs, and call corresponding functions Func AA, Func AB, Func AC, Func BA, Func BB, and Func BC (67 to 72) which have been loaded in the memory and wait for function calls.

Figure 3:
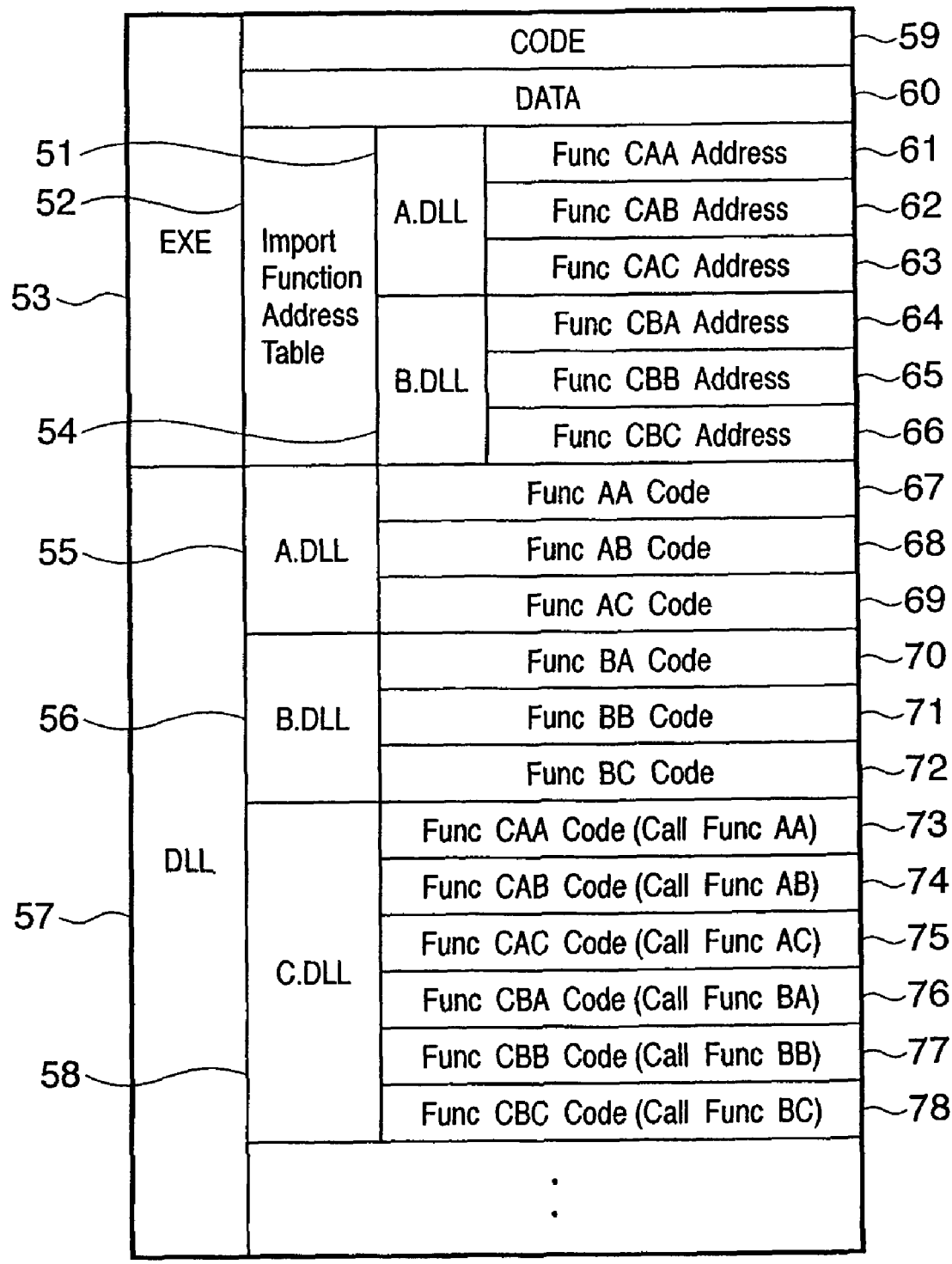
FIG. 3 is a view showing an example of the memory configuration of the information processing apparatus when a function call is mediated using IAT Patch as a log obtaining code according to the embodiment of the present invention.
Figure 4:
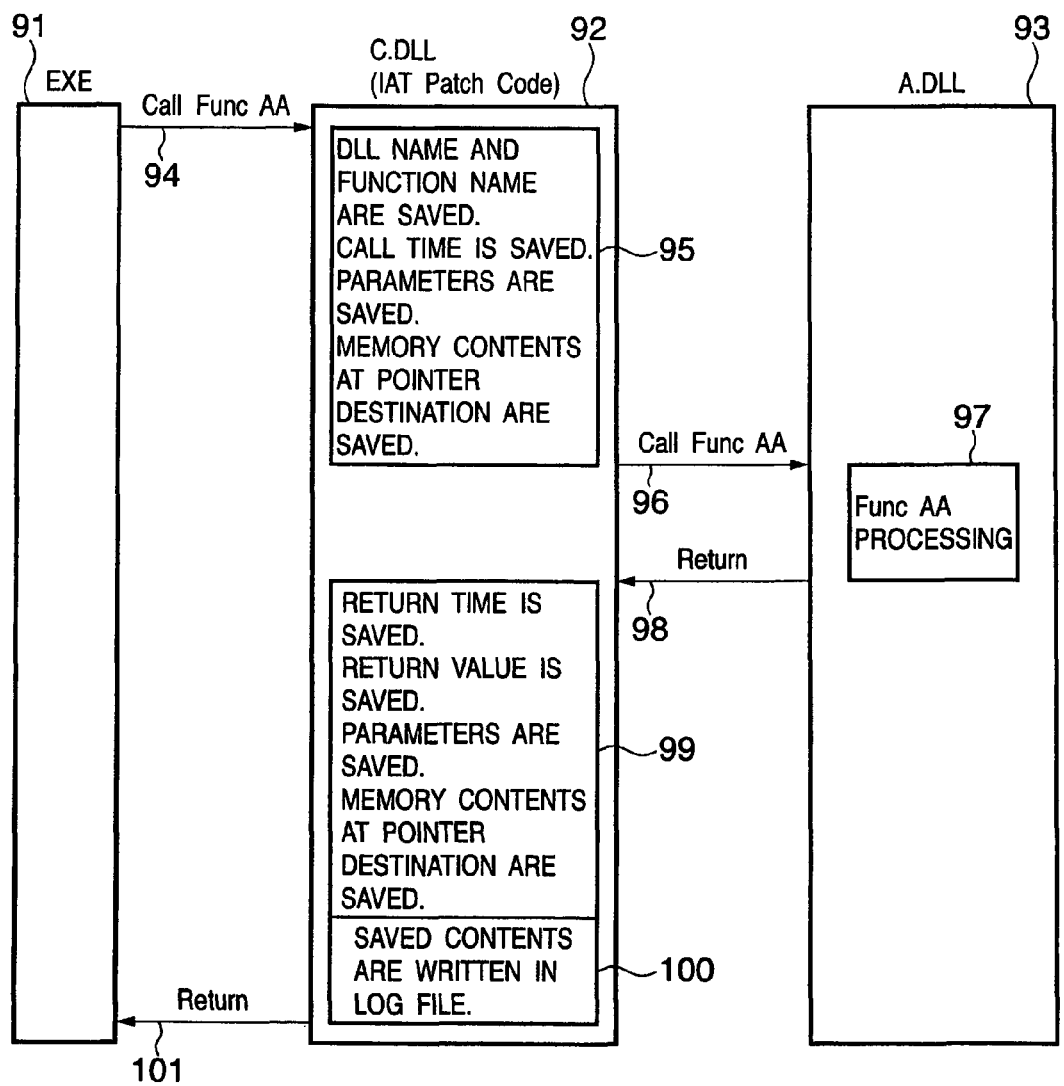
FIG. 4 is a timing chart showing an example when IAT Patch processing is executed in the information processing apparatus according to the embodiment of the present invention.

FIG. 4 is a timing chart showing IAT Patch processing in FIG. 3. For descriptive convenience, FIG. 4 shows an example of how the log obtaining code based on IAT Patch operates when EXE calls Func AA in A.DLL. The same processing is also performed for another function.

When EXE (91) calls Func AA (94), a log obtaining code in C.DLL saves a DLL name and function name in the memory, saves the call time in the memory, saves parameters upon the call in the memory, and saves memory contents represented by pointer parameters upon the call in the memory (95). After that, C.DLL calls Func AA in A.DLL (93) that is supposed to be called (96). Func AA processing (97) in A.DLL ends, and control returns to C.DLL (98). C.DLL saves the return time in the memory, saves the return value in the memory, and saves memory contents represented by pointer parameters upon return in the memory (99). C.DLL writes the saved log information in a file (100), and control returns to EXE as if Func AA of A.DLL normally ended (101).

Figure 5:
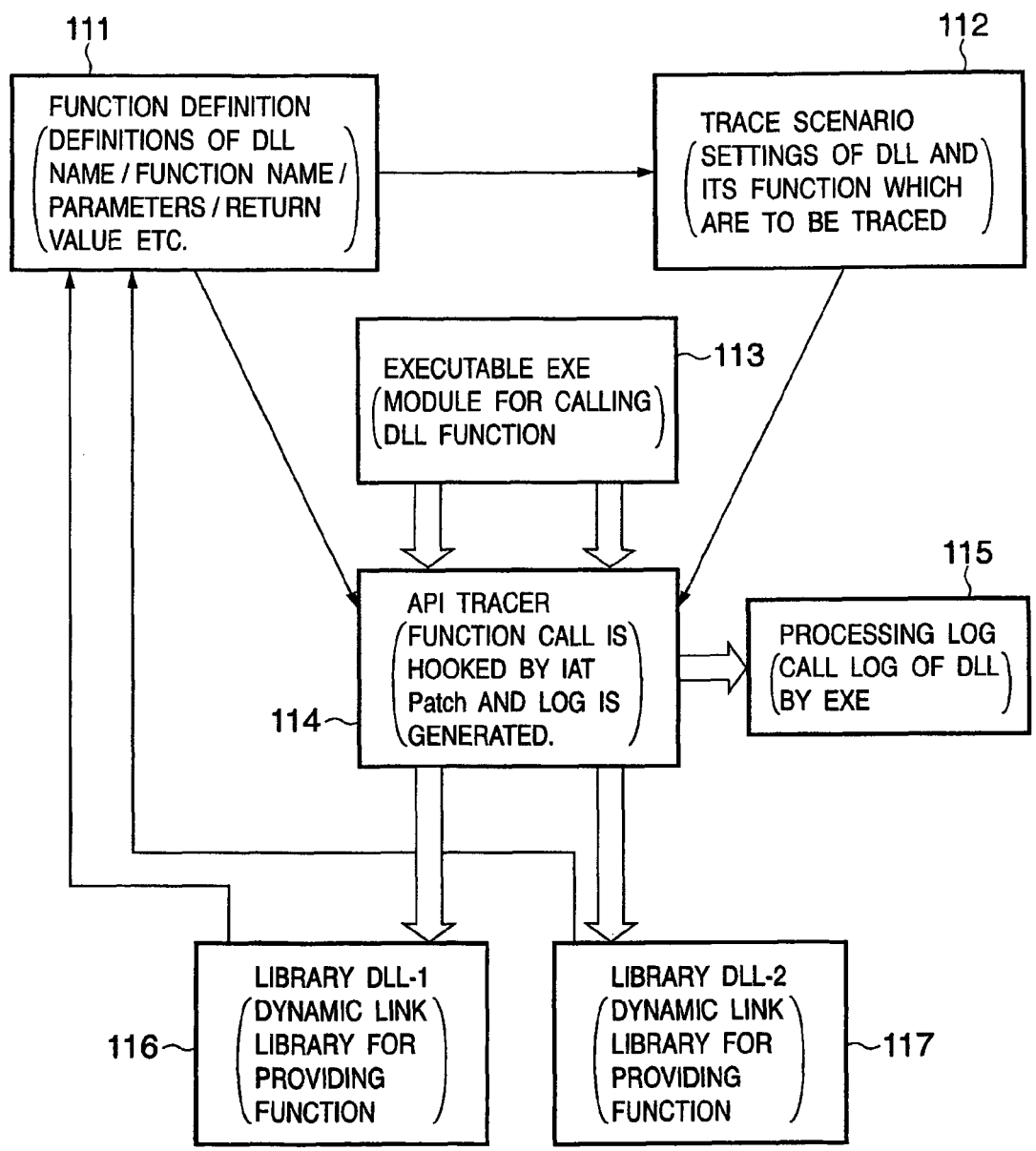
FIG. 5 is a view showing an example of operation when an executable file EXE is executed in the information processing apparatus according to the embodiment of the present invention.

FIG. 5 is a view showing an example of operation when the executable file EXE is executed in the information processing apparatus according to the embodiment. In general, an executable EXE (113) calls functions in DLL-1 (116) and DLL-2 (117). In FIG. 5, a log obtaining code called an API tracer is embedded (114) to generate a processing log (115). The API tracer operates on the basis of a file (111) which describes the function definitions of DLL-1 and DLL-2, and a setup scenario (112) representing a DLL and a function in the DLL for which an import function table is rewritten to obtain a log.

Figure 6:
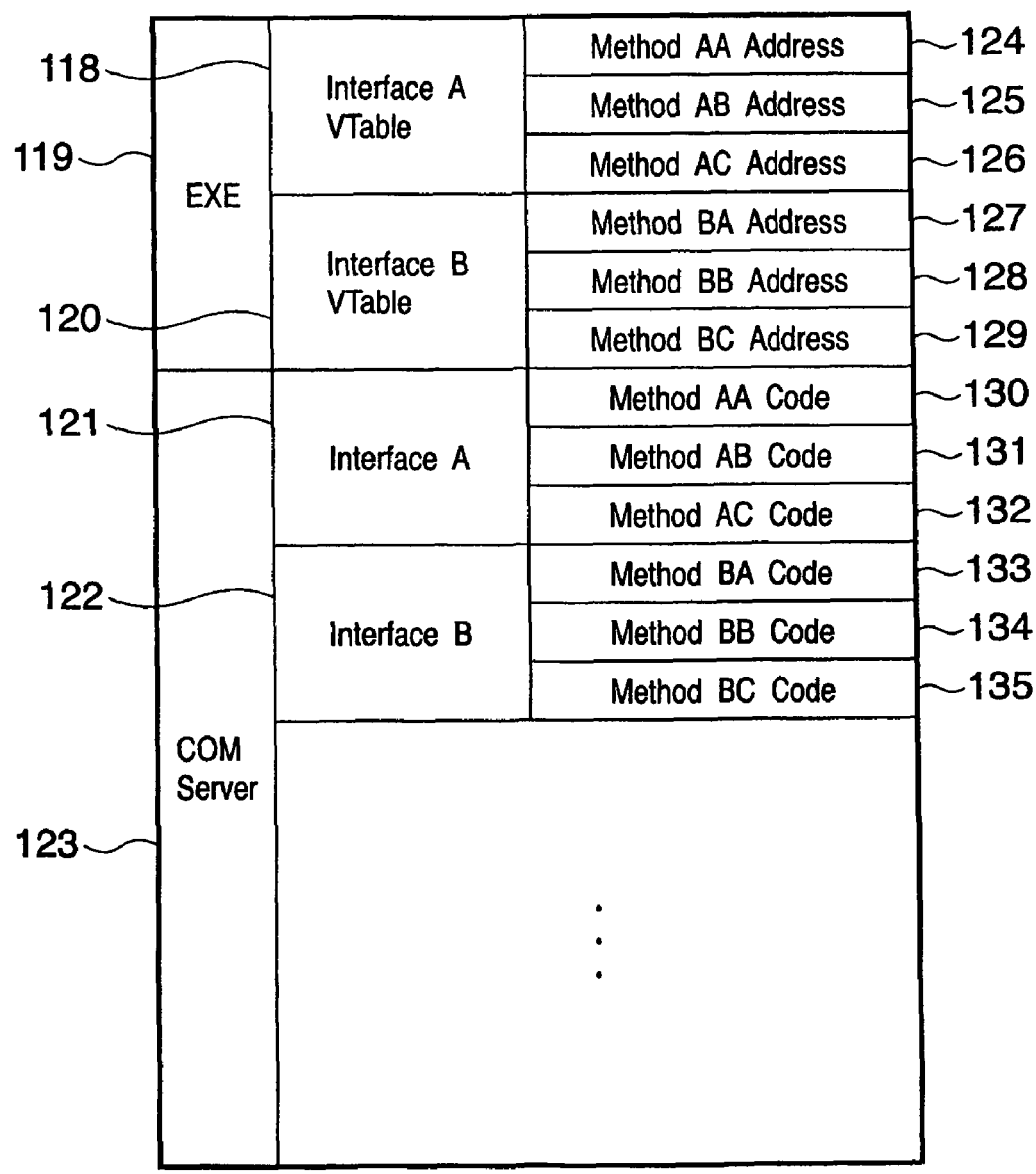
FIG. 6 is a view showing an example of a memory configuration when the executable file EXE creates an interface instance exported to a COM server in the information processing apparatus according to the embodiment of the present invention.

FIG. 6 is a view showing an example of a memory configuration when an executable file EXE (118) creates an interface instance exported to a COM (Component Object Model) server in the information processing apparatus according to the embodiment.

In general, when an interface instance is created, requested interfaces (121 and 122) and their methods (130 to 135) are created in the COM server, and loaded into the memory. Virtual address tables (118 and 120) are created for created interfaces, and passed to EXE which has requested the creation. The virtual address tables hold addresses (124 to 129) created for the respective methods. EXE utilizes these pieces of information, and calls the interfaces. In FIG. 6, one EXE creates two interface instances for Interface A and Interface B, and utilizes methods in the interfaces. Methods used actually are Method AA, Method AB, Method AC, Method BA, Method BB, and Method BC.

When the EXE code calls the function Method AA, a Method AA address (124) written in the virtual address table is read. The address (124) describes the address of a Method AA code (130) which is created as part of Interface A in the COM server. By calling the address, the EXE code can call Method AA of Interface A.

Figure 7:
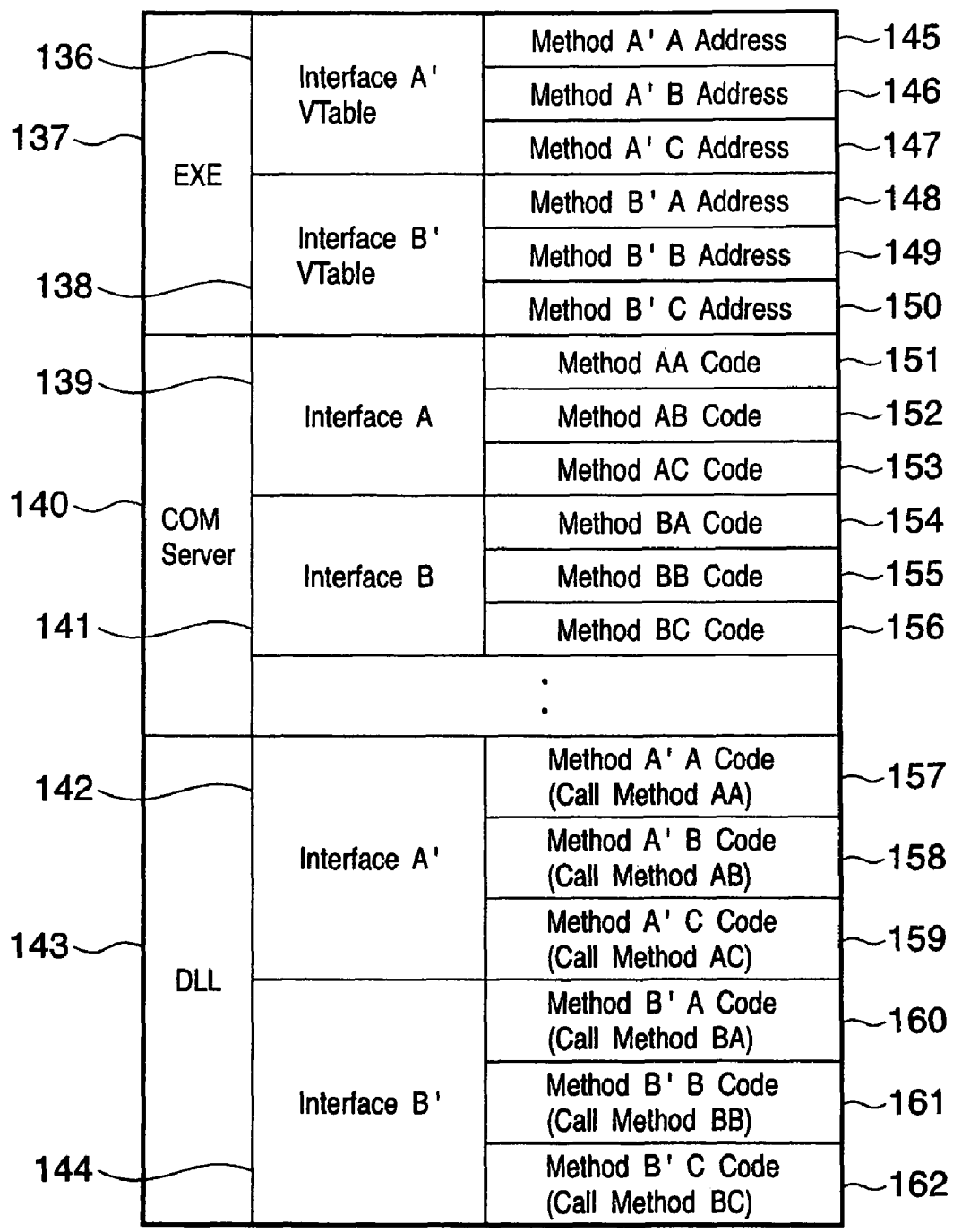
FIG. 7 is a view showing the memory configuration of the information processing apparatus according to the embodiment of the present invention.

FIG. 7 is a view showing the memory configuration of the information processing apparatus according to the embodiment. This memory configuration is different from that in FIG. 6 in that a method call is mediated using VTable Patch (Virtual address Table Patch) as a log obtaining code.

After the start of obtaining a log, a VTable Patch DLL (143) is loaded into the memory. The DLL rewrites the addresses of methods written in virtual address tables (136 and 138) into those (145 to 150) of log obtaining codes Method A'A, Method A'B, Method A'C, Method B'A, Method B'B, and Method B'C in the DLL. The codes (157 to 162) of Method A'A, Method A'B, Method A'C, Method B'A, Method B'B, and Method B'C in the DLL record logs, and call Method AA, Method AB, Method AC, Method BA, Method BB, and Method BC (151 to 156) which have been loaded in the memory and wait for method calls.

Figure 8:
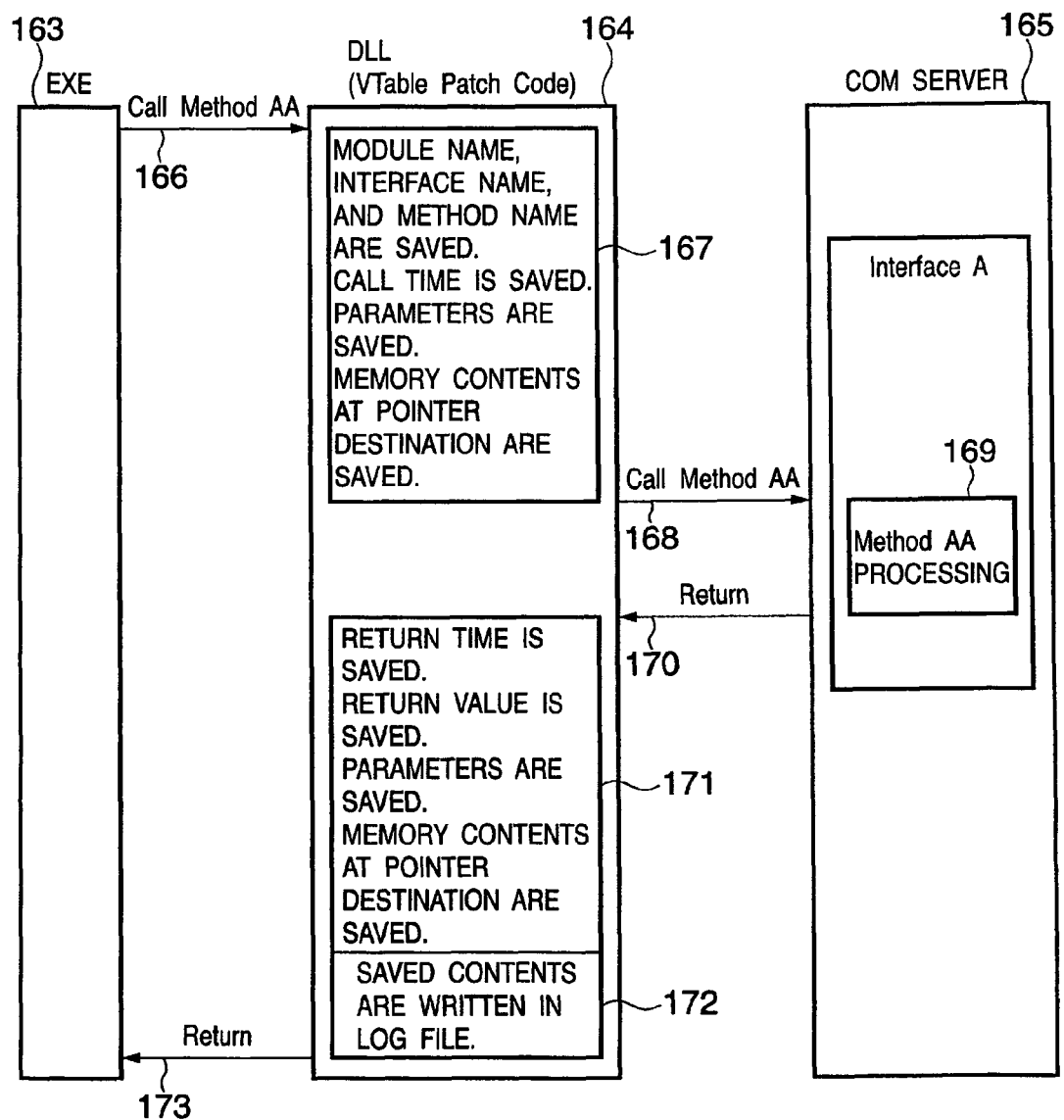
FIG. 8 is a timing chart showing an example when VTable Patch processing is executed in the information processing apparatus according to the embodiment of the present invention.

FIG. 8 is a timing chart showing VTable Patch processing in FIG. 7. For descriptive convenience, FIG. 8 shows an example of how the log obtaining code based on VTable Patch operates when EXE calls Method AA of Interface A in the COM server. The same processing is also performed for another function.

When EXE (163) calls Method AA (166), a log obtaining code in the DLL saves a module name, interface name, and method name in the memory, saves the call time in the memory, saves parameters upon the call in the memory, and saves memory contents represented by pointer parameters upon the call in the memory (167). Thereafter, the DLL calls Method AA in the COM server (165) that is supposed to be called (168). Method AA processing (169) in the COM server ends, and control returns to DLL (170). The DLL saves the return time in the memory, saves the return value in the memory, and saves memory contents represented by pointer parameters upon return in the memory (171). The DLL writes the saved log information in a file (172), and control returns to EXE as if Method AA in the COM server normally ended (173).

Figure 9:
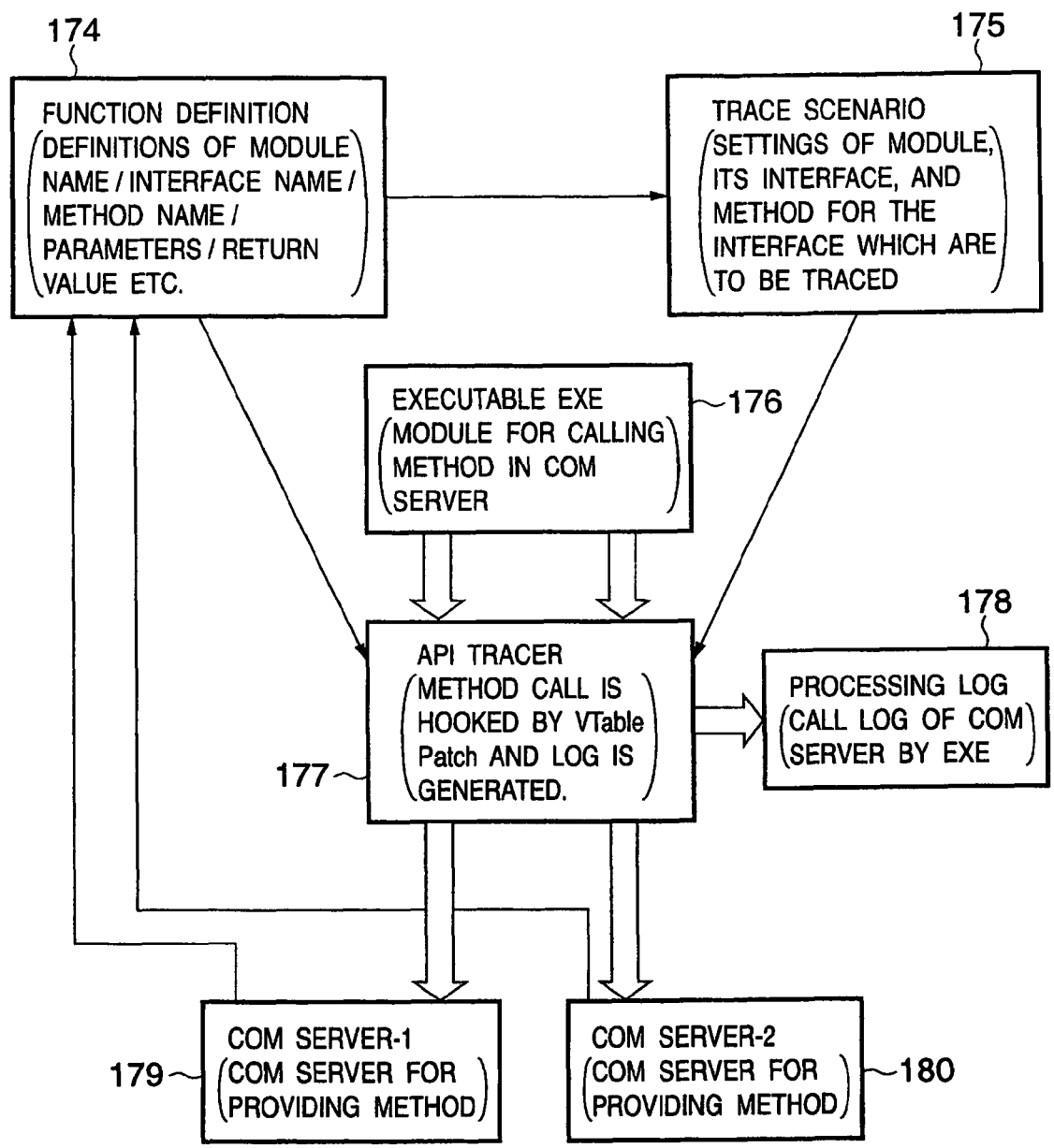
FIG. 9 is a view showing an example of operation when the executable file EXE is executed in the information processing apparatus according to the embodiment of the present invention.

FIG. 9 is a view showing an example of operation when the executable file EXE is executed in the information processing apparatus according to the embodiment. In general, an executable EXE (176) calls methods in COM server-1 (179) and COM server-2 (180). In FIG. 9, a log obtaining code called an API tracer is embedded (177) to generate a processing log (178). The API tracer operates on the basis of a file (174) which describes the function definitions of COM server-1 (179) and COM server-2, and a setup scenario (175) representing a COM server, an interface in the COM server, and a method for the interface for which a virtual address table is rewritten to obtain a log.

Figure 10:
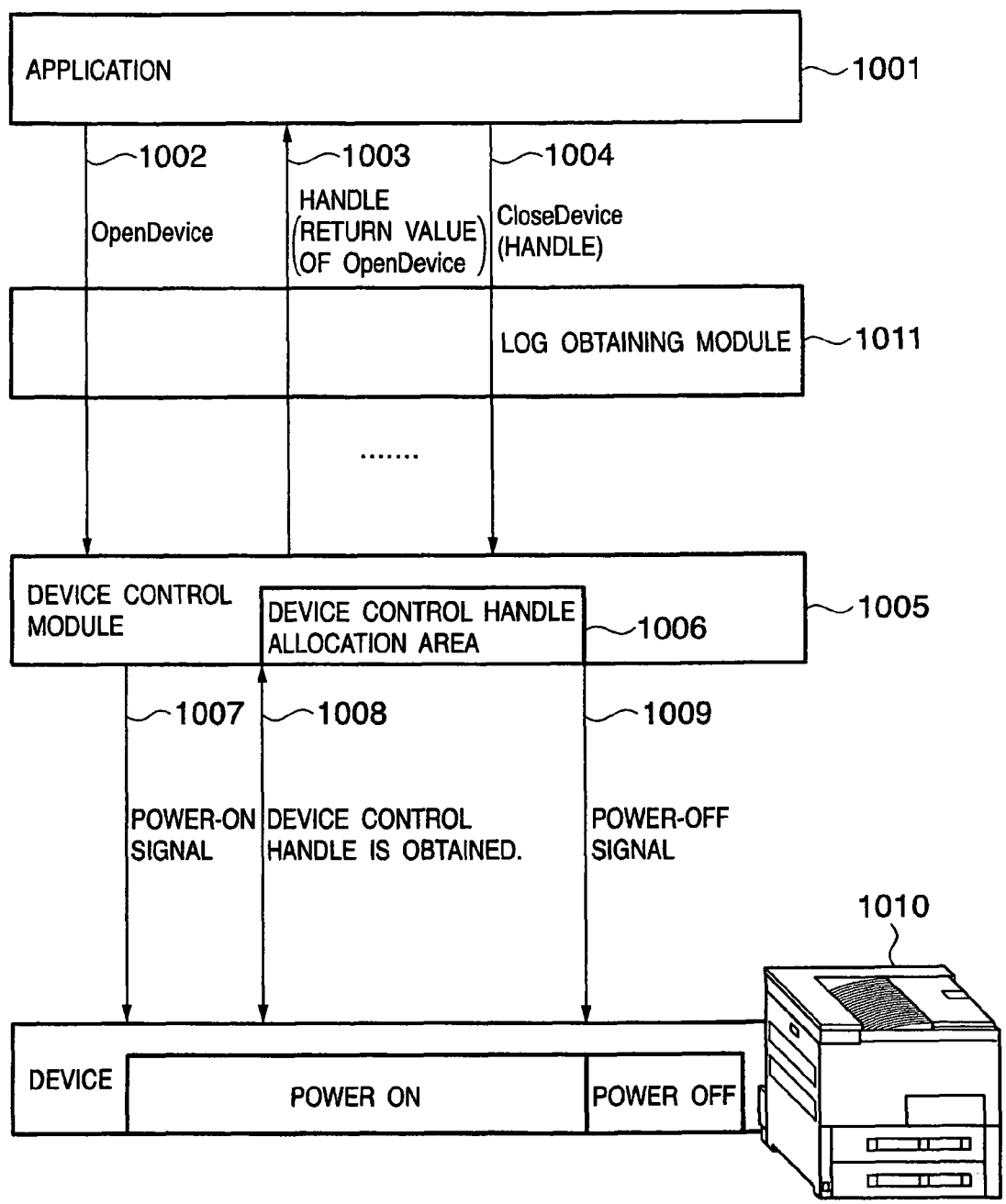
FIG. 10 is a view showing an example of processing subjected to a handle check when handle check processing is performed in the information processing apparatus according to the embodiment of the present invention.

FIG. 10 is a view showing an example of processing subjected to a handle check when handle check processing is performed in the information processing apparatus according to the embodiment. In the embodiment, a handle corresponds to an identifier for identifying a function.

In FIG. 10, an application (1001) calls a device control module (1005) via a log obtaining module (1011) to control a device (1010). In FIG. 10, the application (1001) corresponds to EXE (91) in FIG. 4 and EXE (163) in FIG. 8. The log obtaining module (1011) corresponds to C.DLL (92) in FIG. 4 and DLL (164) in FIG. 8. The device control module (1005) corresponds to A.DLL (93) in FIG. 4 and the COM server (165) in FIG. 8.

An OpenDevice function (1002) powers on a device (1007), obtains and ensures a control handle for the device (1006), and returns the handle to a host application (1003).

A CloseDevice function (1004) powers off the device (1009) on the basis of the handle obtained by the OpenDevice function, and releases the control handle. When the OpenDevice function is used, the CloseDevice function (1004) must always be called, in order to free the handle area and power off a device. If the paired OpenDevice (1002) and CloseDevice (1004) are not called, the device is kept ON and the handle allocation area is not freed. This may pose a problem in executing another application.

FIG. 11 is a view showing an example of a handle attribute definition file according to the embodiment. The handle attribute definition file is held by a handle check application in the information processing apparatus, and used to check the functions in FIG. 10. A handle attribute definition file (1101) describes a DLL (1102) subjected to a handle check, and a function definition file (1103) for the target DLL. The DLL subjected to a handle check corresponds to the device control module (1005) in FIG. 10. The function definition file (1103) describes information including the return value and parameters of functions in the target DLL, and is used to extract information necessary to perform a handle check from log data stored in the log obtaining module (1011). The function definition file (1103) corresponds to the function definitions 111 and 174 in FIGS. 5 and 9.

In the handle attribute definition file (1101), handle attribute settings are defined by TraceFunc (1104), GroupID (1105), FuncProperty (1106), and ParaError (1107) for each function. More specifically, TraceFunc (1104) sets a function name, and GroupID (1105) sets a function group which defines a handle attribute. FuncProperty (1106) sets which of Open, Close, and OpenClose is defined as a handle attribute of the function. ParaError (1107) can set the return value of the function or which of arguments is defined with the Open/Close attribute. Further, ParaError (1107) can make a setting of excluding the function from targets of handle check processing when the return value or argument has a specific value.

In FIG. 11 according to the embodiment, TraceFunc=OpenDevice (1104) defines the OpenDevice function. It is defined that the OpenDevice function belongs to group 0x01 by GroupID=0x01(1105), it has the Open attribute by FuncProperty=0x02 (1106), the DWORD value serving as a return value is the Open value by ParaError=0.DWORD, 0x02, !=0.0 (1107), and handle check processing is done only when the value is not 0.

TraceFunc=CloseDevice (1108) defines the CloseDevice function. It is defined that the CloseDevice function belongs to the same group 0x01 as that of OpenDevice by GroupID=0x01(1109), it has the Close attribute by FuncProperty=0x01(1110), the DWORD value serving as the first argument is the Close value by ParaError=1.DWORD, 0x01, !=0.0 (1111), and handle check processing is done only when the value is not 0. These definitions provide handle attribute settings of performing a handle check using the return value of the OpenDevice function and the first argument of the CloseDevice function.

Figure 12:
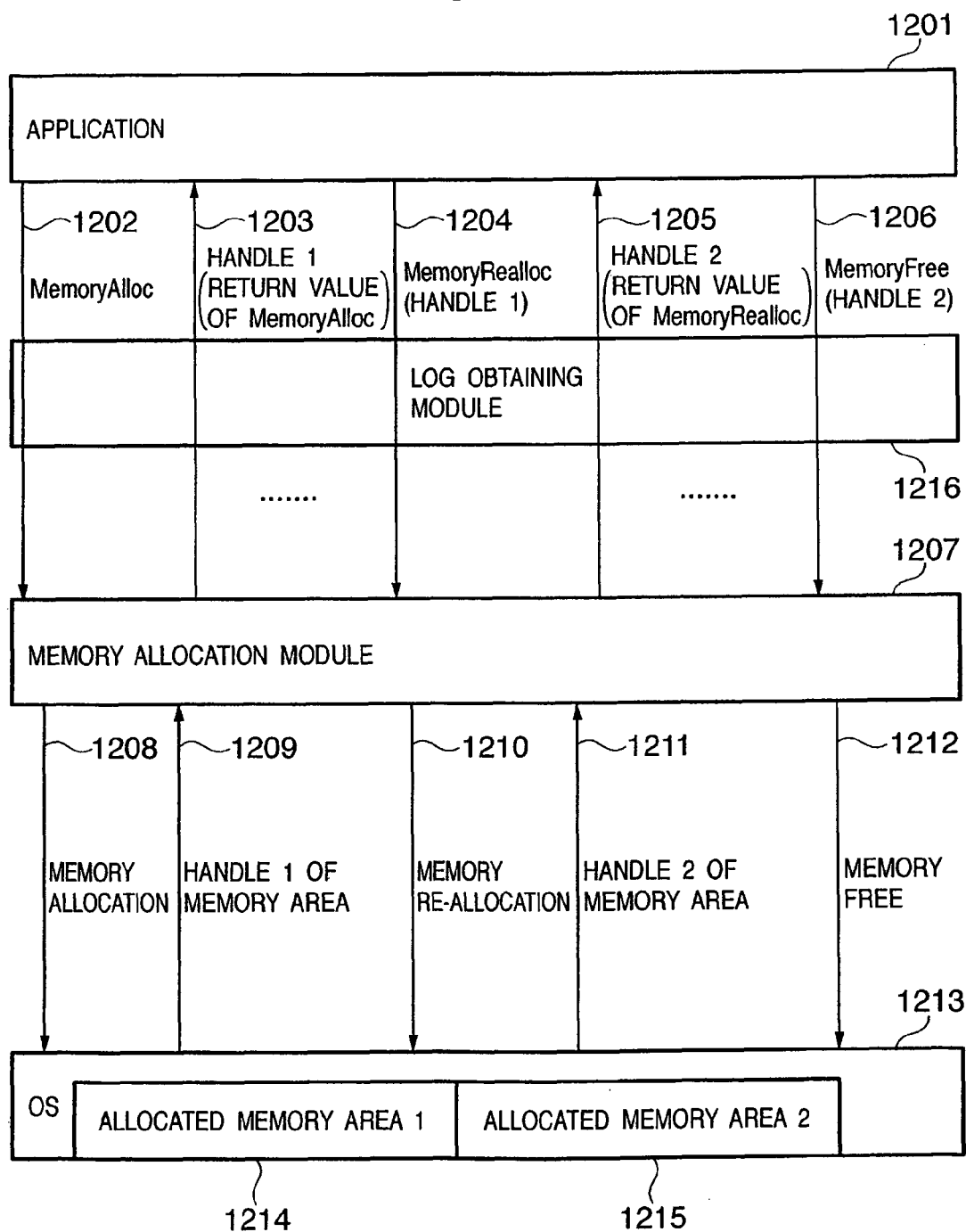
FIG. 12 is a view showing another example of processing subjected to the handle check when handle check processing is performed in the information processing apparatus according to the embodiment of the present invention.

FIG. 12 is a view showing another example of processing subjected to the handle check when handle check processing is performed in the information processing apparatus according to the embodiment. FIG. 12 shows a function when an application (1201) calls a memory allocation module (1207) via a log obtaining module (1216) to request an OS (1213) to allocate/free the memory. In FIG. 12, the application (1201) corresponds to EXE (91) in FIG. 4 and EXE (163) in FIG. 8. The log obtaining module (1216) corresponds to C.DLL (92) in FIG. 4 and DLL (164) in FIG. 8. The memory allocation module (1207) corresponds to A.DLL (93) in FIG. 4 and the COM server (165) in FIG. 8.

A MemoryAlloc function (1202) issues a memory allocation request to the OS (1208), obtains the handle of an allocated memory (1209), and returns the handle to a host application (1203). A MemoryFree function (1206) requests the OS to free the memory (1212) on the basis of the handle obtained by the MemoryAlloc function. When the MemoryAlloc function is used, the MemoryFree function must always be called, in order to free the memory in the OS. If the paired MemoryAlloc and MemoryFree are not called, the memory is kept allocated in the OS and memory leak occurs.

The above processing is almost the same as that in the example of FIG. 10, and in FIG. 12, a MemoryRealloc function (1204) further exists. The MemoryRealloc function re-allocates the memory (1210) on the basis of the memory area allocated by the MemoryAlloc function. When the MemoryRealloc function is used, a memory re-allocation request (1210) is issued to the OS on the basis of the handle of the MemoryAlloc function. The OS performs memory re-allocation processing and returns the handle (1211). At this time, in the OS, the handle may be identical to or different from that for the original memory depending on the memory allocation status.

FIG. 13 is a view showing another example of the handle attribute definition file according to the embodiment. The handle attribute definition file is held by the handle check application in the information processing apparatus, and used to check the functions in FIG. 12.

A handle attribute definition file (1301) contains the same handle attribute settings as the contents shown in FIG. 11, and definitions (1312 to 1316) for the MemoryRealloc function having the OpenClose handle attribute. Definitions (1304 to 1307) for the MemoryAlloc function and those (1308 to 1311) for the MemoryFree function have the same contents as those in FIG. 11.

In the definitions of the MemoryRealloc function, the OpenClose attribute is set by FuncProperty=0×04 (1314). For this reason, ParaError has two settings, and ParaError=1.DWORD, 0×01, !=0.0 (1315) defines that the DWORD value serving as the first argument is the Close value and handle check processing is done only when the value is not 0.

ParaError=0.DWORD, 0×02, !=0.0 (1316) defines that the DWORD value serving as the return value is the Open value and handle check processing is done only when the value is not 0. These definitions provide handle attribute settings of performing a handle check at the return value of the MemoryAlloc function, the first argument of the MemoryFree function, and the return value and first argument of the MemoryRealloc function.

Figure 14:
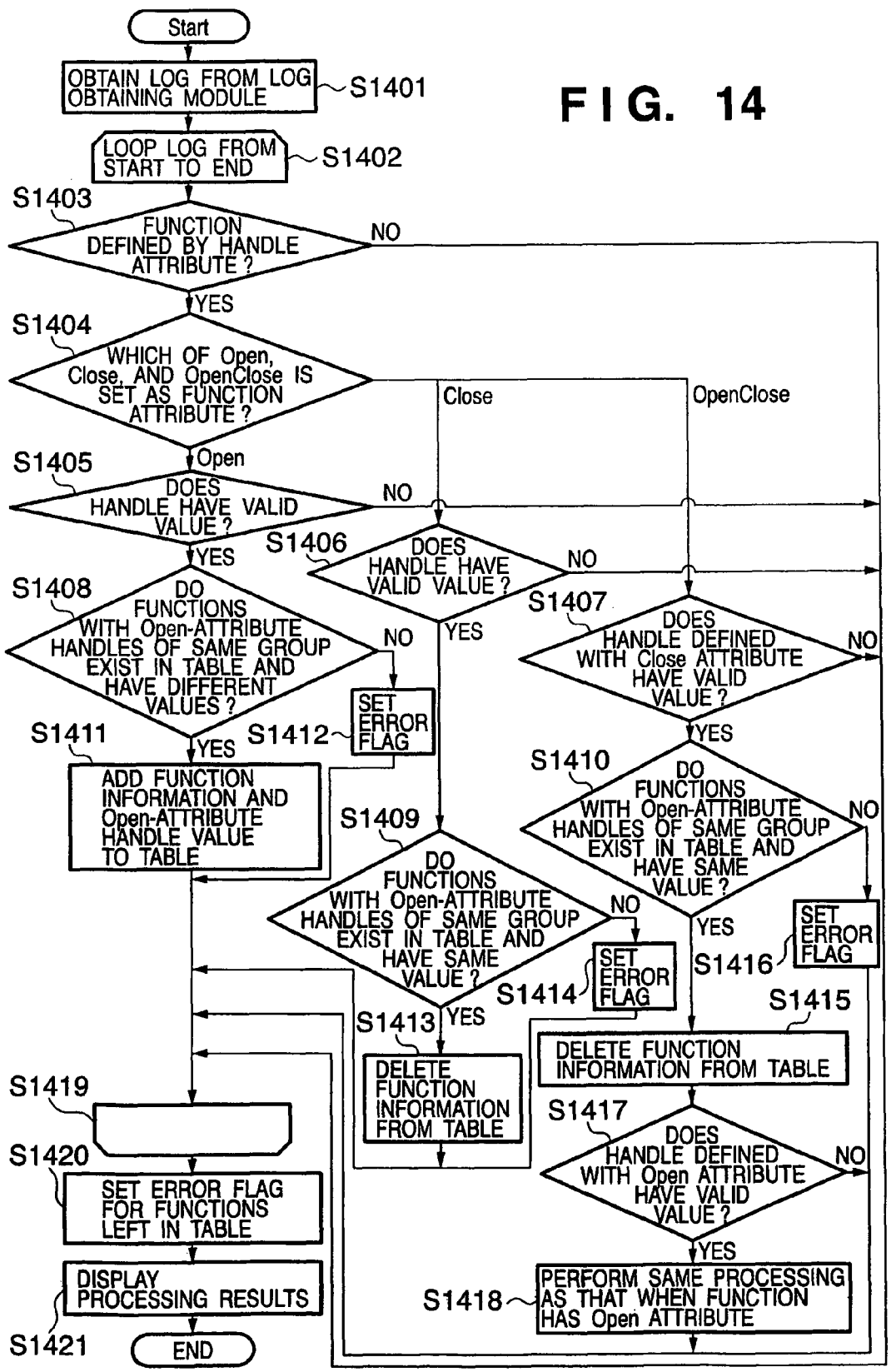
FIG. 14 is a flowchart when a handle check application is executed to perform log analysis processing in the information processing apparatus according to the embodiment of the present invention.

FIG. 14 is a flowchart when the handle check application is executed to perform log analysis processing in the information processing apparatus according to the embodiment. The handle check application is stored in the HDD 6 in FIG. 1, read out to the RAM 3, and executed by the CPU 1.

The handle check application obtains the log of a DLL subjected to a handle check from the log obtaining module on the basis of the handle attribute definition file shown in FIG. 11 or 13 (S1401). The log contains a handle serving as a function identifier, and function attribute information such as the function name, function group, and handle attribute.

Handle check processing proceeds by checking the obtained log sequentially from the start to end (S1402 to S1419). It is determined whether a function obtained as the log has been set by the handle attribute definition (S1403). If it is determined that the function has not been defined, the function is not processed. If it is determined that the function has been defined, it is determined which of the Open, Close, and OpenClose attributes is set as the FuncProperty setting in the handle attribute definition file for the function (S1404).

If it is determined that the function has the Open attribute, a handle value is obtained in accordance with the ParaError setting to determine whether the value is a valid handle value (S1405). Whether the value is valid is based on the setting contents of ParaError in the handle attribute definition file. In FIGS. 11 and 13, the handle attribute definition file defines that handle check processing is done only when the value is not 0. Thus, it is determined that the handle value is valid unless it is 0.

If it is determined that the handle value is invalid, the flow returns to S1403 to process another function without performing any handle check processing. If it is determined that the handle value is valid, a function having the same GroupID as that of the current function and having a handle of the Open attribute is registered by handle check processing in a handle registration table for registering an unmatched function. Then, if the function is registered, it is determined whether the handle value of the registered function is different from that of the current function (S1408). If the handle value of the registered function and that of the current function coincide with each other, it is determined that the result of Open processing is invalid, and an error flag is set for the function subjected to handle check processing (S1412). If no function has been registered, or the function has been registered but the handle values are different from each other, function information and the handle value of the Open attribute are saved in the handle registration table (S1411).

If the function attribute is the Close attribute, a handle value is obtained in accordance with the ParaError setting to determine whether the value is a valid handle value (S1406). The determination criterion of whether the value is valid is the same as that for the Open attribute. If it is determined that the handle value is invalid, the flow returns to S1403 to process another function without performing any check processing. If it is determined that the handle value is valid, it is determined whether a function having the same GroupID as that of the current function and having a handle of the Open attribute or OpenClose attribute has been registered in the handle registration table, and whether the handle value is equal to the handle value of the current function (S1409). If no function has been registered in the handle registration table, or the function has been registered but the handle values are different from each other, it is determined that the current processing is Close processing called without any Open processing, and the error flag is set for the function subjected to handle check processing (S1414). If the handle values coincide with each other, the Open and Close processes are normally done, and the function information and handle values in the handle registration table are deleted (S1413).

If the function attribute is the OpenClose attribute, the handle value of the Close attribute is obtained in accordance with the ParaError setting to determine whether the value is a valid handle value (S1407). This determination method is also the same as the above-described one. If it is determined that the handle value is invalid, the flow returns to S1403 to process another function without performing any check processing. If it is determined that the handle value is valid, it is determined whether a function having the same GroupID as that of the current function and having a handle of the Open attribute has been registered in the handle registration table, and whether the handle value is equal to the handle value of the current function (S1410).

If no function has been registered, or the function has been registered but the handle values are different from each other, it is determined that the current processing is Close processing called without any Open processing, and the error flag is set for the function subjected to handle check processing (S1415). If the handle values coincide with each other, the Open and Close processes are normally done, and the function information and handle values in the handle registration table are deleted (S1415).

The handle value of the Open attribute is obtained in accordance with the ParaError setting to determine whether the value is a valid handle value (S1417). If it is determined that the handle value is invalid, processing for the current function ends, and processing for another function continues in S1403. If it is determined that the handle value is valid, the same processing (S1418) as those (S1408, S1411, and S1412) for a function of the Open attribute is executed.

The above processing is repeated. If all functions registered in the log have undergone handle check processing, functions left in the handle registration table at that time correspond to Open processes for which no Close processing has been done, and the error flag is set for these functions (S1420).

As a result, handle check processing ends for all functions in the log, and the processing results are displayed on the display 8 (S1421). All the functions contained in the log are listed in a processing result display window. For a function for which the error flag has been set in handle check processing, it is displayed that a handle check error has occurred.

FIG. 15 is a table showing an example of the processing result display window displayed on the display 8 in S1421 of FIG. 14. Error information is displayed as "x" in the handle check error column (1501) of the log. For a function with "x", the error flag is set in handle check processing.

In FIG. 15, a function on the first line (1502) of the log represents that the module is HandleCheck.dll, the function is OpenDevice, no argument is set, and the return value is DWORD handle whose value of 0x5034206D. In handle check processing, information on this function is added to the unmatched-function table at this stage.

The second line (1503) represents a CloseDevice function for Close processing that is paired with the function on the first line. The first argument defined by the Close attribute is 0x5034206D which is equal to the value of the handle check definition on the first line. In this processing, OpenDevice on the first line and CloseDevice on the second line are normally processed. Thus, the function on the first line is deleted from the table, and no error information is displayed in the handle check error column.

For a CloseDevice function on the third line (1504), the argument has the same value as that of the Open function on the first line that has already been closed by the Close function on the second line. OpenDevice having the same return value as this argument value does not exist in the table. Thus, an error is displayed in the handle check error column. On the fourth line (1505), MemoryAlloc is executed, and its information is added to the table. However, MemoryAlloc results in an error because MemoryFree serving as Close processing is not called even after handle check processing proceeds to the end of the log.

Also, a MemoryFree function on the seventh line (1508) results in an error because this function has the same handle value as a MemoryAlloc function on the fifth line (1506) that has already been closed by a MemoryRealloc function on the sixth line (1507). A MemoryFree function on the eighth line (1509) is normally processed because it has the same value as a value which has been re-allocated and opened by the MemoryRealloc function on the sixth line (1507).

As described above, according to the embodiment, handles serving as the identifiers of paired functions are defined. Processing which has not normally ended can be detected on the basis of an obtained log.

More specifically, according to the embodiment, whether Open/Close processing of a function is not omitted can be checked. A failure in normally ending processing (e.g., a power On/Off failure of a device or memory leak) can be easily detected, decreasing the number of debagging steps and that of evaluation steps.

A characteristic feature of the present invention is to check processing associated with a function/method handle without changing any function/method code. Handle check processing itself is not limited to the above-described method.

OTHER EMBODIMENT

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM, DVD-R or DVD-RW).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-364782 filed on Dec. 16, 2004, which is hereby incorporated by reference herein.

What is claimed is:

1. An information processing computer apparatus which executes a first module, a second module, and a third module stored in a memory of the information processing computer apparatus for mediating a call from the first module to a function in the second module and obtaining a log of processing in the second module in response to the call, comprising:
   a log obtaining unit which obtains the log from the third module;
   an extraction unit which extracts, from the obtained log, attribute information of functions and identifiers assigned to the functions;
   a first end determination unit which determines, on the basis of attribute information of the extracted functions, and identifiers assigned to the extracted functions, that the processing in the second module has normally ended, when a first function having attribute information corresponding to the attribute information of the second function and the same identifier as the identifier assigned to the second function is extracted by said extraction unit;
   a registration unit which registers the attribute information of the first function and the identifier assigned to the first function;
   a deletion unit which deletes the attribute information and the identifier of the first function that are registered in said registration unit when said first end determination unit determines that the processing by the first function and the second function have normally ended; and
   a second end determination unit which determines that processing by the first function which is kept registered has not normally ended, when the attribute information and the identifier of the first function are not deleted from said registration unit and are kept registered even after said extraction unit extracts attribute information and identifiers of all functions from the obtained log and said end determination unit performs determination for all the extracted functions.

2. The apparatus according to claim 1, wherein a first function which is different in at least identifier from the first function which has been registered, is registered in said registration unit.

3. The apparatus according to claim 2, wherein when a first function which is not registered in said registration unit exists, said end determination unit determines that processing in the second module on the basis of the unregistered first function has not normally ended.

4. A method of controlling an information processing computer apparatus which executes a first module, a second module, and a third module stored in a memory of the information processing computer apparatus for mediating a call from the first module to a function in the second module and obtaining a log of processing in the second module in response to the call, comprising:
   obtaining the log from the third module;
   extracting, from the obtained log, attribute information of functions and identifiers assigned to the functions;
   first determining, on the basis of attribute information of the extracted functions, and identifiers assigned to the extracted functions, that the processing in the second module has normally ended, when a first function having attribute information corresponding to the attribute information of the second function and the same identifier as the identifier assigned to the second function is extracted in said extracting step;
   registering the attribute information of the first function and the identifier assigned to the first function;
   deleting the attribute information and the identifier of the first function that are registered in said registering step when said first determining determines that the processing by the first function and the second function have normally ended; and
   second determining which determines that processing by the first function which is kept registered has not normally ended, when the attribute information and the identifier of the first function are not deleted in said registering step and are kept registered even after said extraction step extracts attribute information and identifiers of all functions from the obtained log and said determining step performs determination for all the extracted functions.

5. The method according to claim 4, wherein a first function which is different in at least identifier from the first function which has been registered, is registered in the registration unit.

6. The method according to claim 5, wherein in the end determination step, when a first function which is not registered in the registration unit exists, processing in the second module on the basis of the unregistered first function is determined not to have normally ended.

7. A computer program stored on a computer-readable storage medium for causing a computer to execute a method of controlling an information processing apparatus which executes a first module, a second module, and a third module for mediating a call from the first module to a function in the second module and obtaining a log of processing in the second module in response to the call, the method comprising:
   obtaining the log from the third module;
   extracting, from the obtained log, attribute information of functions and identifiers assigned to the functions;
   first determining, on the basis of attribute information of the extracted functions, and identifiers assigned to the extracted functions, that the processing in the second module has normally ended, when a first function having attribute information corresponding to the attribute information of the second function and the same identifier as the identifier assigned to the second function is extracted in said extracting step;
   registering the attribute information of the first function and the identifier assigned to the first function;
   deleting the attribute information and the identifier of the first function that are registered in said registering step when said first determining determines that the processing by the first function and the second function have normally ended; and
   second determining which determines that processing by the first function which is kept registered has not normally ended, when the attribute information and the identifier of the first function are not deleted in said registering step and are kept registered even after said extraction step extracts attribute information and identifiers of all functions from the obtained log and said determining step performs determination for all the extracted functions.

8. A computer-readable storage medium which stores a computer program defined in claim 7.

* * * * *